United States Patent [19]

Kudou et al.

[11] Patent Number: 5,056,218

[45] Date of Patent: Oct. 15, 1991

[54] METHOD OF MAKING A HOLLOW METAL PISTON HAVING ELASTIC STRIP CASTED TO ITS SKIRT

[75] Inventors: Masaaki Kudou, Kumagaya; Tosio Ogiwara, Gyoda, both of Japan

[73] Assignee: Izumi Automative Industry Co., Ltd., Kawagoe, Japan

[21] Appl. No.: 415,875

[22] Filed: Oct. 2, 1989

Related U.S. Application Data

[62] Division of Ser. No. 93,242, Sep. 4, 1987, Pat. No. 4,890,543.

[30] Foreign Application Priority Data

Nov. 25, 1986 [JP] Japan ............................... 61-179773

[51] Int. Cl.[5] .............................................. B23P 15/10

[52] U.S. Cl. .......................... 29/888.045; 29/888.047; 29/888.05

[58] Field of Search ......... 29/527.5, 888.044, 888.045, 29/888.047, 888.05; 92/195, 225, 226, 227, 228, 230, 292; 123/193 P; 164/98, 112, 137, 332, 333, 340

[56] References Cited

U.S. PATENT DOCUMENTS

| | | | |
|---|---|---|---|
| 1,731,904 | 10/1929 | Nelson | 29/888.047 X |
| 1,770,818 | 7/1930 | Summers | 29/888.047 X |
| 4,074,617 | 2/1978 | Cockcroft | 92/228 |
| 4,776,075 | 10/1988 | Kawabata et al. | 164/98 X |

FOREIGN PATENT DOCUMENTS

| | | | |
|---|---|---|---|
| 180465 | 1/1936 | Switzerland | 29/888.047 |

*Primary Examiner*—Joseph M. Gorski
*Assistant Examiner*—Peter Dungba Vo
*Attorney, Agent, or Firm*—William D. Hall

[57] ABSTRACT

A light metal piston for internal combustion engines has a pair of inserts on the inside of upper piston skirt made of a material of lower thermal expansion coefficient than that of the light metal, such as steel. Each insert has a pair of bands which are joined by a connecting portion of the insert in the region of the gudgeon pin boss. Each band extends circumferetially away from the gudgeon pin boss, so as to control thermal expansion of the piston skirt. A free end of each band are bent inwardly, so that the insert can be set firmly on the mold core of the piston during casting operation by snapping the bent portions of the insent into the grooves on the mold core.

6 Claims, 5 Drawing Sheets

METHOD OF MAKING A HOLLOW METAL PISTON HAVING ELASTIC STRIP CASTED TO ITS SKIRT

This is a division of application Ser. No. 07/093,242, filed Sept. 4, 1987, now U.S. Pat. No. 4,890,543.

FIELD OF THE INVENTION

The present invention relates to a method of making a light metal piston for internal combustion engines which has a pair of steel inserts cast-in on the inside of the piston skirt in order to control thermal expansion of the piston skirt.

BACKGROUND OF THE INVENTION

In an internal combustion engine, this type of piston has a crown, a skirt and a pair of gudgeon pin bosses, and a pair of inserts made of a material of lower thermal expansion than that of the light metal, such as steel. Each insert is shaped so that at least part of the insert conforms to the inside shape of the piston skirt, whereby to form a bi-metallic element with the light metal of the piston in order to control the expansion of the piston skirt, when the piston is heated during engine operation. Each insert has a pair of bands extending around the inside of the piston skirt from the region of the gudgeon pin boss, and the bands of said pair are joined by a connecting portion of the insert in the region of the gudgeon pin boss.

In a prior method of making such a piston, permanent magnets are firmly fixed in recesses of the mold core where the inserts are to be set, and the inserts are positioned firmly on the mold core during casting operation by the magnetic force. However, the magnetic force decreases gradually due to high temperature during casting operation and then the inserts tend to fall off from the mold core when a molten metal is poured into the mold cavity.

When the piston is cast by the squeeze casting process, in which a very high pressure around 1,000 $kg/cm^2$ is applied in the molten metal, the heat flux from the molten metal into the mold core is accelerated because of better contact between the molten metal and the mold core. Therefore, the magnet is exposed to higher temperature and the magnetic force decreases very rapidly. Consequently, the magnet on the mold core for squeeze casting must be replaced at every 500 to 1000 casting cycles, which increases the production cost of the squeeze-cast piston with cast-in steel inserts remarkably.

In a second prior method of making such a piston, two setting pins per one insert are fixed in the mold core. Two setting holes are drilled at the corresponding position of the insert, and the inserts are positioned on the mold core by the engagement of setting pins on the mold core and holes of the inserts.

In gravity die casting process, the mold core for the piston is normally divided into several pieces, so that the mold core can be freely taken out from the piston casting after the molten metal solidifies, even if the piston inside has under-cut portions or if there is such engagement of setting pins and holes of the inserts.

In case of squeeze casting process, the mold core must be of one piece, because a very high pressure on the molten metal would press the melt into every gap between the divided mold core pieces, which would hinder the mold core from taking out from the piston casting. Thus, it is impossible to apply such setting pins for casting pistons with steel inserts by squeeze casting process.

SUMMARY OF THE INVENTION

It is therefore an object of the present invention to avoid the above-mentioned problems and other disadvantages of conventional light metal piston for internal combustion engines of the type discussed above and method of making the same.

More particularly, it is an object of the invention to provide an improved completely new method of making a light metal piston with expansion controlling steel inserts which does not require the conventional setting devices for steel inserts any more, and which offers the easy and reliable setting of steel inserts.

According to the present invention, a light metal piston for internal combustion engines has a crown, a skirt and gudgeon pin bosses, and a pair of inserts made of a material of lower thermal expansion coefficient than that of the light metal, such as steel sheet material. Each insert has a pair of bands joined by a connecting portion of the insert in the region of the gudgeon pin boss. The bands extend circumferentially away from the gudgeon pin boss so as to control thermal expansion of the piston skirt. The free ends of the bands have bent portions which are bent inwardly by the angle of about 90 degrees. On the mold core, the grooves are provided to accept the bent portions of the inserts. The inserts are pressed against the mold core and the inner faces of the bent portions snap at the grooves on the mold core, whereby to sustain the inserts firmly in the grooves by the elasticity of the steel inserts, when a molten metal is poured into the mold cavity.

Consequently, in the present invention, falling off of the inserts during casting operation is completely eliminated. In addition, maintenance costs of the mold can be drastically reduced, because it is not necessary to replace the magnets or setting pins for fixing the inserts to the mold core in the prior methods. Furthermore, automatic setting of the inserts can now be introduced to reduce production cost, because the setting operation is very simple and reliable.

The above and other objects, features and advantages of the present invention will become more apparent from the following description when taken in conjunction with the accompanying drawings in which a number of preferred embodiments of the present invention are shown by way of illustration examples.

DETAILED DESCRIPTION OF THE PREFERRED EMBODIMENTS

A number of embodiments of the present invention will now be described with reference to the accompanying drawings.

Figure 1:
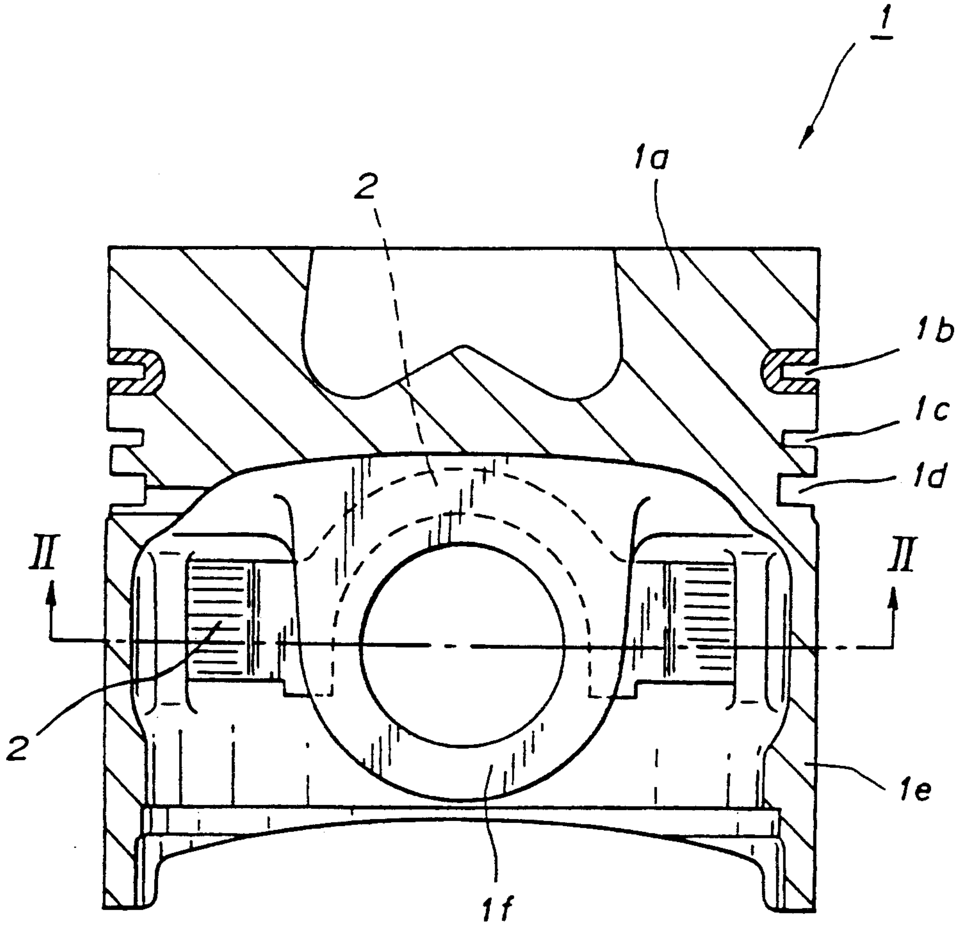
FIG. 1 is a longitudinal cross-section of a piston according to the present invention.
Figure 2:
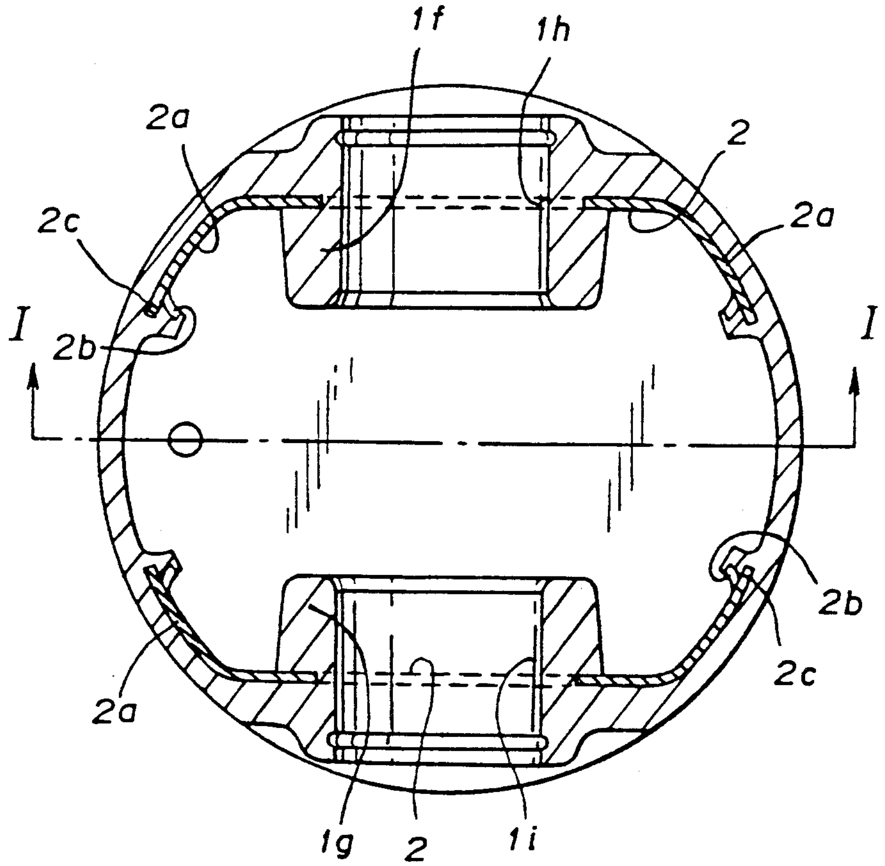
FIG. 2 is a section on the line II—II of FIG. 1.

As shown in FIG. 1, the piston 1 has a crown 1*a*, ring groove bands 1*b*, 1*c* and 1*d* around the periphery of the crown 1*a*, and a skirt 1*e* integrally connected to the crown 1*a*. The piston 1 has a pair of gudgeon pin bosses 1*f*, 1*g* which are formed so as to extend inwardly from the piston skirt 1*c* and which are connected to the crown 1*a* by a pillar on the piston skirt 1*e*. Bores 1*h*, 1*i* receive the gudgeon pin are formed in the bosses 1*f*, 1*g* respectively. The piston 1 is made of light metal, for example, aluminum alloy or magnesium alloy, and is provided with a pair of inserts 2, 2 made of sheet steel, extending circumferentially away from the gudgeon pin bosses 1*f*, 1*g*, in order to control thermal expansion of the piston skirt 1*e* which results from the heating of the piston 1 from room temperature to its operating temperature in an engine.

Figure 3:
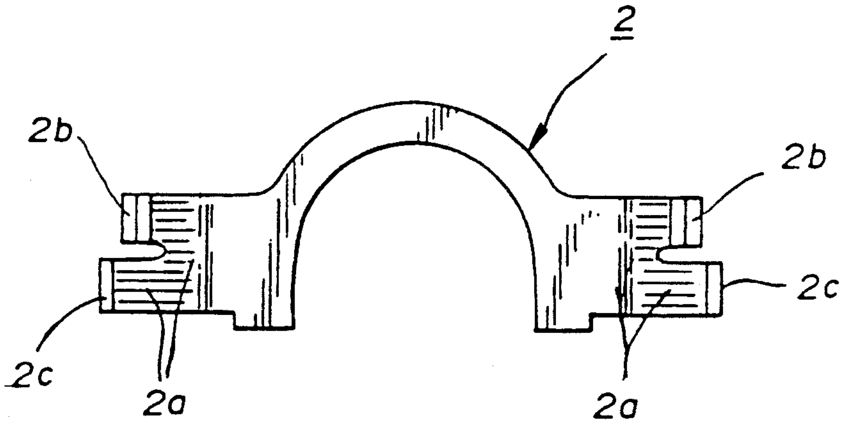
FIG. 3 is an elevation view of a first preferred embodiment of a insert for use in the piston according to the invention.
Figure 4:
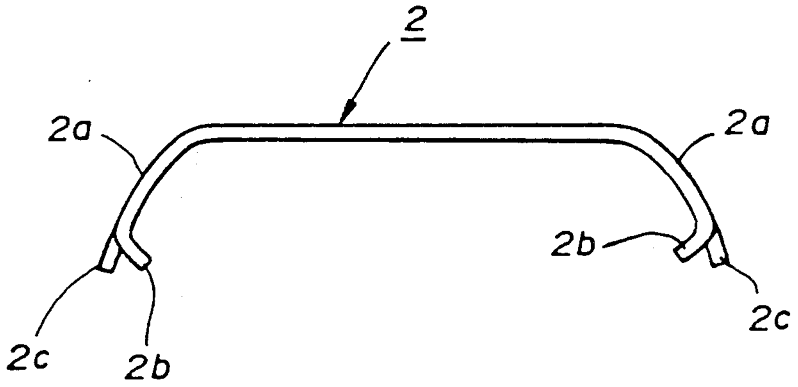
FIG. 4 is a plan view of the insert of FIG. 3.
Figure 5:
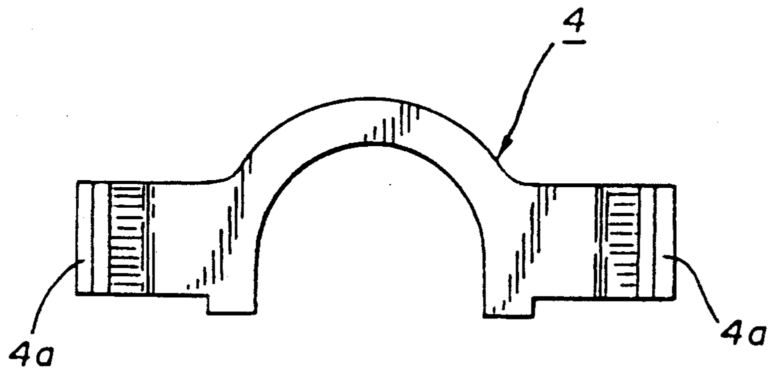
FIG. 5 is an elevation view of a second preferred embodiment of a insert for use in the piston according to the invention.
Figure 6:
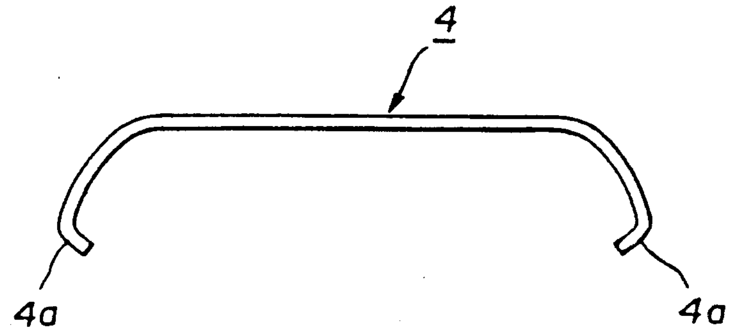
FIG. 6 is a plan view of the insert of FIG. 5.

The inserts 2, 4 shown in FIG. 3 and 5, consist of a pair of bands 2*a*, 2*a* extending circumferentially around the inside of the piston skirt 1*e*, and a connecting portion joining the two bands.

At least a portion of the free end of each band 2, 4 is bent inwardly by the angle of about 90 degree.

The radial length of the bent portions 2*b*, 4*a* should not be less than the thickness of the insert, because in the case of a short bent portion the bending of the insert becomes difficult and the holding force of the bent portions 2*b*, 4*a* during casting becomes weaker. The maximum radial length of the bent portions 2*b*, 4*a*, should not exceed 10 times of the thickness of the insert 2, because the holding force of the bent portions 2*b*, 4*a* does not increase any more and the snapping of the insert 2 at the mold core becomes more difficult. The vertical length of the bent portions 2*b*, 4*a* can be varied depending on the circumstances, for example only a part of the free end can be bent to ease the bending operation.

If only an upper half 2*b* of the free end should be bent as shown on FIG. 3, it would be better to cut out the boundary area between the bent portion 2*b* and the not-bent portion 2*c*, in order to ease the bending operation and to eliminate the sharp edge at the boundary area which may cause a crack in the piston 1.

Figure 7:
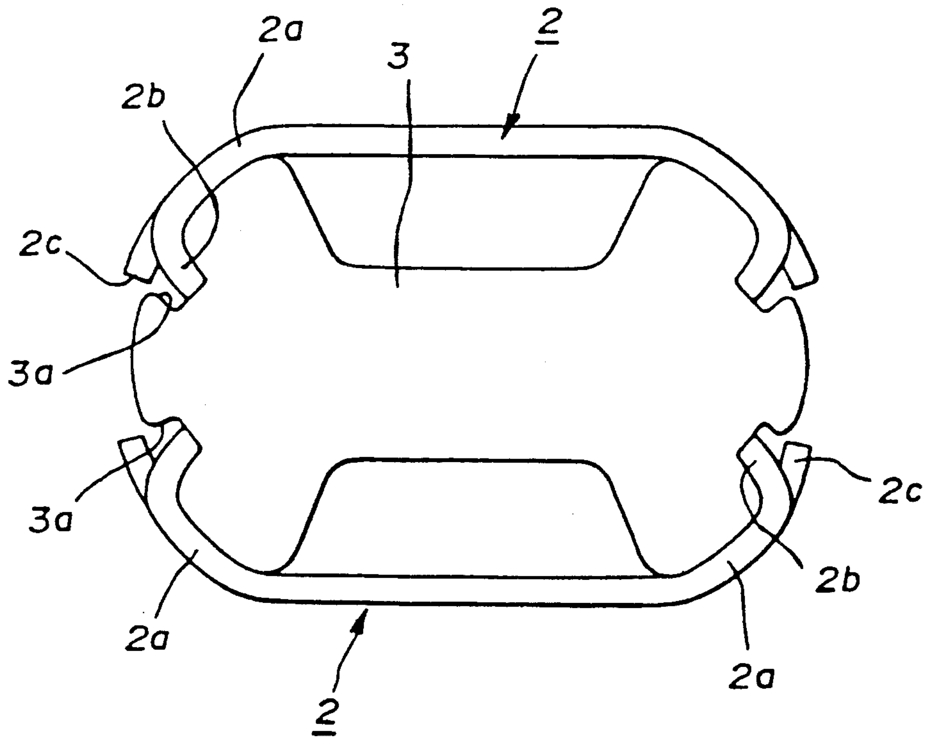
FIG. 7 is a plan view of fixing the insert to the mold core according to the invention.

Shown in FIG. 7, on the mold core 3, the grooves 3*a*, 3*a* are provided to accept the bend portions 2*b*, 2*b* of the insert 2. The inserts 2, 2 are pressed against the mold core 3 and the inner faces 2*d* of the bent portions 2*b*, 2*b* snap into the grooves 3*a*, 3*a* on the mold core 3, whereby to sustain the inserts 2, 2 firmly on the mold core 3 by the elasticity of the steel inserts 2, 2, and a molten metal is poured into the mold 3 to form the piston 1.

FIG. 5 shows a second preferred embodiment of the insert 4 according to the present invention which is identical with that of FIG. 3, except that the entire vertical length of the free end is bent inwardly.

Each insert 2 or 4, as the case may be, has a connecting portion embedded in a gudgeon pin boss 1*f* (or 1*g*), and has a pair of bands such as 2*a*, for example, with each band having a bent portion such as 2*b* or 4*a*.

As mentioned above, according to the present invention, falling off of the inserts 2, 4 during casting operation is completely eliminated, and maintenance costs of the casting mold can be drastically reduced, because it is not necessary to replace the magnets or setting pins for fixing the inserts to the mold core. In addition, automatic setting of the inserts can be introduced to reduce production cost because the setting operation is very simple and reliable.

Furthermore, this method of holding the inserts on the mold core can be applied to cast pistons by gravity die casting or squeeze casting, but it is more advantageous to apply it to the squeeze casting process, because conventional method of holding the inserts on the mold core during casting cannot be applied economically to the piston production.

Obviously, numerous modifications and variations of the present invention are possible in the light of the above teachings. It is therefore to be understood that within the scope of the appended claims, the invention may be practiced otherwise than as specifically described herein.

What is claimed is:

1. A method of making a hollow metal piston comprising a skirt having a predetermined thermal expansion, and at least one insert elastic strip having a different thermal expansion than that of said skirt so that when said piston is in use, said thermal expansion of said strip at least partially compensates for the thermal expansion of said skirt, the method comprising the steps of:

- providing a mold core having two opposite ends, each of said opposite ends having at least one groove formed therein;
- providing at least one insert elastic strip having end portions;
- shaping end portions of said at least one strip, thereby producing a bent portion at each end portion of said at least one strip;
- positioning said at least one strip around said mold core so that said bent portions of said at least one strip elastically enter and securely engage said grooves of said mold core, said bent portions of said at least one strip elastically biasingly holding said mold core, thereby producing a strip and core assembly;
- placing the strip and core assembly inside of a skirt portion;
- casting at least a partial portion of metal around said strip and core assembly, thereby joining said at least one strip to an inner wall of said skirt portion;
- removing said mold core from the casting metal, thereby leaving said at least one strip casted to said skirt portion.

2. The method of claim 1 in which said mold core extends substantially contiguously with said curved portions of said strip.

3. The method of claim 1 comprising:

- forming a gudgeon pin bosses on said piston, and
- casting a portion of said strip near its center in one of said bosses.

4. The method of claim 1, comprising:

- forming two gudgeon pin bosses on said piston,
- providing two of said strips, one for each of said two bosses, and
- casting a portion of each strip near the center of the strip in the boss which is complementary to such strip.

5. A method of making a hollow metal piston comprising a skirt having a predetermined thermal expansion, and at least one insert elastic strip having a different thermal expansion than that of said skirt so that when said piston is in use, said thermal expansion of said strip at least partially compensates for the thermal expansion of said skirt, the method comprising the steps of:

providing a mold core having two opposite ends, each of said opposite ends having at least one groove formed therein;

providing at least one insert elastic strip having end portions;

shaping end portions of said at least one strip, thereby producing bent portions at each end portion of said at least one strip, at least one of said bent portions extending inwardly and radially relative to an inner wall of a skirt portion;

positioning said at least one strip around said mold core so that said bent portions of said at least one strip elastically enter and securely engage said grooves of said mold core, said bent portions of said at least one strip elastically biasingly holding said mold core, thereby producing a strip and core assembly;

placing the strip and core assembly inside of as skirt portion;

casting at least a partial portion of metal around said strip and core assembly, thereby joining said strip to an inner wall of said skirt portion, said at least one bent portion of said at least one strip extending inwardly and radially away from said inner wall of said skirt portion;

removing said mold core from the casting metal, thereby leaving said at least one strip cast to said skirt portion.

6. The method of claim 5 in which the shaping of said end portions comprises providing each strip with end portions in which each entire end portion will point in a direction away from the inner wall of said skirt when the casting step is complete.

* * * * *